United States Patent [19]
Rich

[11] Patent Number: 4,525,915
[45] Date of Patent: Jul. 2, 1985

[54] THREAD COVER FOR PROTECTING A SEAL

[76] Inventor: Roy L. Rich, P.O. Box 143, Pecos, Tex. 79772

[21] Appl. No.: 548,690

[22] Filed: Nov. 4, 1983

[51] Int. Cl.³ .................... B23P 17/00; B25B 27/14
[52] U.S. Cl. ...................................... 29/423; 29/271; 29/277; 411/386; 411/371
[58] Field of Search ................ 29/423, 271, 277, 464; 411/371–373, 340–342, 345, 429, 386

[56] References Cited

U.S. PATENT DOCUMENTS

| 1,394,608 | 10/1921 | Darem | 29/271 |
| 1,822,649 | 9/1931 | Evans | 29/271 |
| 3,817,146 | 6/1974 | Scott | 29/464 |
| 3,979,994 | 9/1976 | Collignon | 29/271 |

FOREIGN PATENT DOCUMENTS 14106  9/1895  United Kingdom ................ 29/271

Primary Examiner—Howard N. Goldberg
Assistant Examiner—Steven Nichols
Attorney, Agent, or Firm—Marcus L. Bates

[57] ABSTRACT

A thread cover is attached to the terminal end of a threaded shaft in a releasable manner. The thread cover includes a main body having a magnet at one end thereof and a plurality of flexible arms affixed to the opposed end thereof. The main body is magnetically attached to the threaded shaft end, and the flexible arms are arranged to be adjacent to and cover the main body as well as the threads of the shaft end. When the threaded end of the shaft is extended through a seal means, the arms prevent the threads of the shaft from engaging and damaging the interior of the seal means. After the threaded end of the shaft has been telescopingly extended through the seal means, the thread cover is easily removed from the shaft end.

15 Claims, 6 Drawing Figures

$\dfrac{3'' \text{ SHAFT}}{6} \quad \pi = 1.57''$

THREAD COVER FOR PROTECTING A SEAL

BACKGROUND OF THE INVENTION

There are many instances when a shaft has a marginal length which is sealingly received in a reciprocatory manner within a seal means. The end of the shaft is often threaded, and must be extended through the seal means. Sometimes it is necessary that the threaded marginal end of the shaft have the same diameter or almost the same diameter as the medial part of the shaft which is sealingly received within the seal means. Great care must be taken in extending the threaded end of the shaft through the seal means, or otherwise, the seal means will become damaged at the most critical part thereof, thereby necessitating the replacement of the seal means, or alternatively, causing early failure of the seal. The labor involved in replacing some seal means is enormous in both time and cost.

In order to overcome this undesirable seal damage, those skilled in the art have determined that damage to the seal can be avoided by placing several layers of tape about the threads of the shaft end, and thereafter forcing the shaft through the seal means and relying upon the tape to insulate the seal surface from the threaded surface. This is not always an acceptable procedure for the reason that often the working area precludes satisfactory removal of the tape from the shaft threads. Moreover, the adhesive and pieces of the tape are liable to become imbedded within the threaded surface, which sometimes interferes with the proper assembly of the threaded shaft end.

Others sometimes have a special female plug fabricated, so that the plug can be screwed onto the threads, thereby protecting the seal interior from the threaded shaft end as it is telescoped through the seal. This procedure is undesirable because the inaccessibility of the shaft end makes removal of the protector therefrom difficult. Moreover, the cost of fabricating the threaded protector is sometime considerable. Furthermore, the thread protector sometime must be built with extremely thin sidewalls in order to accommodate both the outside diameter of the threaded surface and the inside diameter of the seal.

Accordingly, it would be desirable to have made available a thread cover which can be magnetically affixed to a threaded shaft end with the cover having means thereon for isolating the threaded shaft surface from the inner surface of the seal means. Apparatus which achieves this desirable goal is the subject of the present invention.

SUMMARY OF THE INVENTION

A thread cover for protecting the inner surface of a seal means from the threads located on a marginal terminal end of a shaft, during assembly of the shaft and seal. The thread cover includes a main body having a forward and rear end. The rear end is in the form of a magnet which enables the thread cover main body to be removably affixed in axially aligned relationship respective to the terminal end of a threaded shaft by magnetic attraction therebetween. A plurality of flexible arms are attached at the far end of the main body for protectively insulating the threads from the seal.

The flexible arms have a free marginal end which extends rearwardly and enclose the main body, with the arm continuing rearwardly from the rear end of the main body and covering the threaded surface of the shaft. The arms preferably are in the form of a plurality of relatively long, flexible thin strips of metal having a medial portion attached to the forward end of the main body, with the remaining marginal ends thereof being arranged to extend rearwardly into the recited overlapping relationship respective to the shaft threads.

The rear end of the main body can be removably affixed by magnetic attraction to the terminal threaded end of the shaft, with the arms arranged to encircle and cover the shaft threads so that the thread cover and threaded shaft end can be jointly extended through a seal means as a single unit, thereby protecting the seal means because the shaft threads are isolated from contact therewith. The thread cover of this invention is subsequently easily removed from the shaft end by manually grasping the main body and forcing the magnet to move away from the shaft end.

A primary object of the present invention is the provision of a thread cover device which is easily and removably affixed to a shaft end in a manner which isolates the threaded shaft end and prevents the threads thereof from damaging a seal.

Another object of the invention is to provide a thread cover apparatus which is magnetically affixed to the terminal end of a threaded shaft which precludes the threads thereof from damaging a seal when the shaft end is telescopingly and slidably extended through the seal.

A further object of the present invention is the provision of a thread cover apparatus for the threaded end of a shaft which enables the threaded shaft end to be telescopingly received in a slidable manner through the seal means.

A still further object of this invention is to provide an apparatus for covering threads which are magnetically affixed in a removable manner to the end of a threaded shaft to enable the threads thereof to be extended through a seal without damage thereto.

Another and still further object of this invention is the provision of a protector device for protecting a seal from the threads on the end of a shaft as the shaft end is extended through the seal means and which is easily affixed to and then removed from the shaft.

These and various other objects and advantages of the invention will become readily apparent to those skilled in the art upon reading the following detailed description and claims and by referring to the accompanying drawings.

The above objects are attained in accordance with the present invention by the provision of a method for use with apparatus fabricated in a manner substantially as described in the above abstract and summary.

DETAILED DESCRIPTION OF THE PREFERRED EMBODIMENTS

Figure 1:
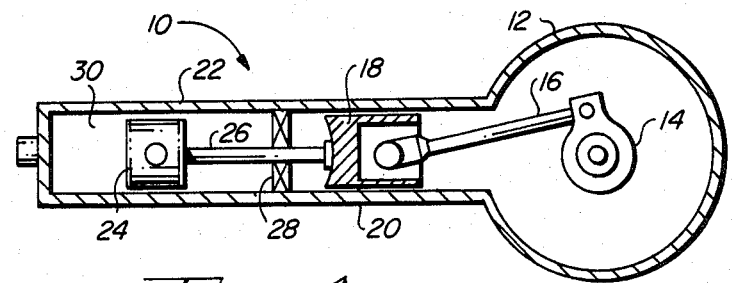
FIG. 1 is a part-schematical, part diagrammatical, side view of a prior art gas compressor.

FIG. 1 of the drawings illustrates a prior art gas compressor 10, which equally well could be a steam engine or a gas engine. The compressor includes a crank case 12 having a crank 14 to which there is journaled a first connecting rod 16. The connecting rod 16 reciprocates a crosshead 18 within a cylinder 20. Cylinder 22 reciprocatingly receives a power piston 24, which is reciprocated by a second connecting rod 26. The second connecting rod 26 is sealingly received through a packing gland, or seal means 28, which separates the interior of cylinders 20 and 22 one from the other. The seal means 28 is often quite complex in design and expensive in cost. Compressor head 30 delivers compressed air, as may be desired.

Figure 2:
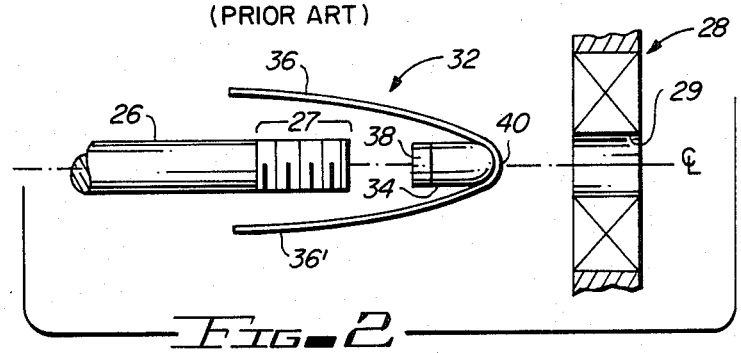
FIG. 2 is an enlarged, broken, side elevational view of a thread cover made in accordance with the present invention shown in conjunction with a threaded shaft end and a seal means.

In FIG. 2, together with FIGS. 3-6, a thread cover device in the form of a tool 32, made in accordance with the present invention, has a main body 34 thereof axially aligned with the before mentioned connecting rod 26 and seal means 28. The connecting rod 26 has a threaded marginal terminal end 27 which must be slidably extended through the inside diameter 29 of seal means 28. The tool is provided with a plurality of flexible arms 36, 36', which extend rearwardly from the main body 34 for encapsulating or protecting or covering the threaded surface 27, thereby precluding damage to the inside diameter 29 of seal means 28 when the rod end is passed therethrough. The rear marginal end 38 of the main body 34 is in the form of a powerful magnet. The forward end 40 of the main body is curved in a streamlined manner in the illustrated manner of FIGS. 2 and 3.

Figure 3:
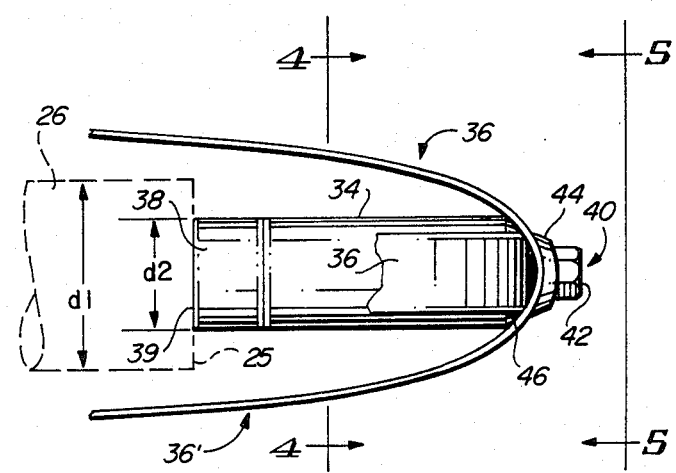
FIG. 3 is a further enlarged, broken, side elevational view of the apparatus disclosed in FIG. 2.
Figure 4:
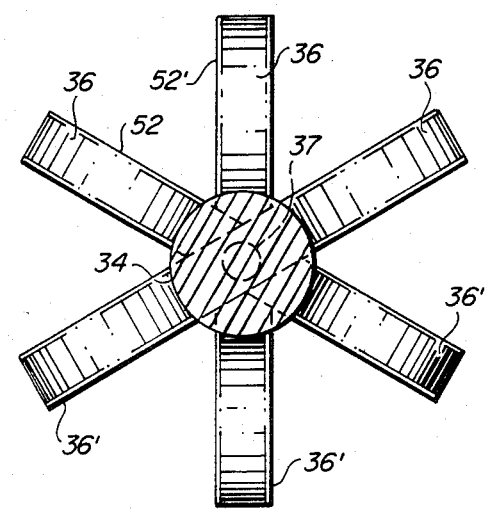
FIG. 4 is a cross-sectional view taken along line 4—4 of FIG. 3.
Figure 5:
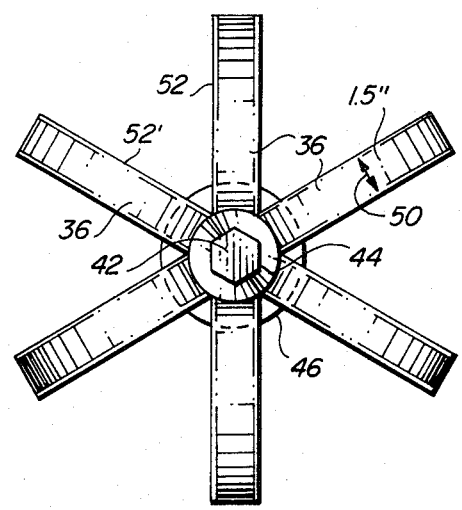
FIG. 5 is an end view looking in the direction indicated by the arrows 5—5 of FIG. 3; and, FIG. 6 is a broken, side elevational view showing the apparatus of FIG. 3 in its operative configuration.
Figure 6:
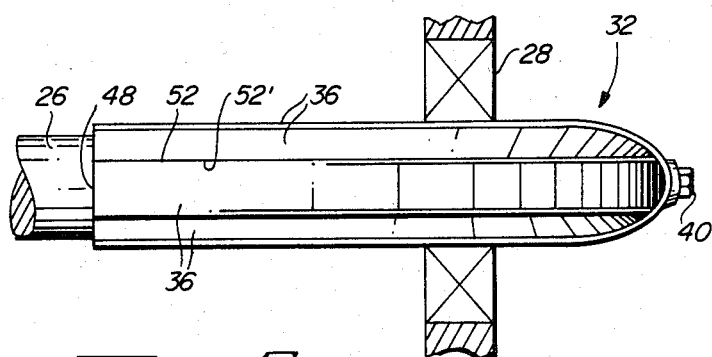

As best seen illustrated in FIG. 3, together with FIGS. 4-6, the forward end 40 of the main body 34 of the tool 32 terminates in a bolt 42 which compresses a beveled or dished washer 44 against the main body and thereby secures the flexible elongated arms 36, 36' to the forward end 40 of the main body 34. The flexible arms 36, 36' preferably are relatively thin, long flexible strips of stainless steel, as for example; 0.006 inch thick shim stock 0.65 inches wide and 9 inches in length, measured from the bolt 42; there being 6 legs fastened to a ¾ inch diameter main body.

The medial length of each rectangular strip which form the arms is apertured and receives bolt 42 therethrough so that when the bolt 42 is threadedly made up respective to the main body 34, the plurality of flexible arms are anchored to the forward end 40 of the main body 34. The forward end 40 of the main body 34 preferably is curved in the indicated manner of numeral 46 in FIG. 3. The main body has a diameter D2 while the threaded shaft end has a diameter D1, with the former being smaller than the latter. Numeral 39 indicates the rear surface of the magnet 38, while numeral 25 indicates the terminal end face formed at the free end of shaft 26.

As seen illustrated in FIGS. 4 and 5, the plurality of radially positioned flexible arms 36 have adjacent converging edge portions 52, 52' which are curved back towards the rear of the main body and brought into overlying relationship respective to shaft threads 27. The edge portions 52, 52' may overlap one another in the illustrated manner of FIG. 6 when the diameter D1 is relatively small, and the edge portions 52, 52' may be slightly spaced from one another when the diameter D1 of the shaft is relatively large. As seen illustrated in FIG. 4, the medial portion 37 of each elongated strip of flexible metal is anchored to the curved forward end of the main body with the opposed marginal ends thereof each forming one of the flexible arms 36. As best seen illustrated in FIG. 5, the width 50 of each flexible arm is of a dimension whereby when the arms are curved back over the body and over the shaft threads in the manner of FIG. 6, the threads 27 are separated from the inside diameter 29 of the seal means 28 by the presence of the flexible arms.

The magnet 38 preferably is a powerful cobalt alloy having a length less than the length of the main body 34, and a diameter D2 slightly less than the diameter D1 of the shaft. One thread cover 32 can be used for a number of different diameters of shaft ends. The length of the individual arms 36 must be sufficient to extend over the entire length of the threaded area 27 of the shaft end. The diameter D2 of the main body 34 must be no more than the diameter D1 of the shaft end and preferably is considerably less than the diameter of the shaft which enables a single tool 32 to be used for installing a number of different diameter shafts through a seal means.

The present invention provides a thread cover 32 having a main body 34 and 38 which includes a forward end 40 and a rear end 38. The rear end 38 of the main body preferably is a powerful magnet cemented into axial alignment with the front end 34 of the main body. A plurality of flexible arms 36 are attached at the forward end 40 of the main body 34. The thread protector is magnetically attached in a removable manner to the terminal end 25 of a shaft 26 and the arms are curved rearwardly over the threaded surface 27 of the shaft 26, thereby enabling the shaft 26 to be extended through a seal means 28 while precluding damage to the inside diameter 29 thereof. Thereafter, the thread protector 32 is manually removed from the shaft end 26 by imposing a lateral force onto the main body 34 of a sufficient magnitude to cause the magnetic attraction to be overcome.

I claim:

1. A tool for covering the threads of a shaft, said tool includes a main body, said main body includes a forward end and a rear end, means forming a magnet at the rear end of said main body;

a plurality of flexible arms attached at the forward end of said main body; said flexible arms each have a free marginal end which extends radially from said main body and can be curved rearwardly and circumferentially arranged to enclose said main body;

whereby the rear end of the main body can be magnetically attached in a removable manner to the end of a threaded shaft, the arms arranged to protectively cover the shaft threads, whereupon the tool and shaft end can then be extended through a seal means while the shaft threads are isolated from contact with the seal means.

2. The tool of claim 1 wherein said flexible arms are a plurality of relatively long, thin, flexible metallic strips having a medial part attached to the forward end of said main body, thereby leaving the marginal ends extending along said body and arranged to lie adjacent to and cover the threaded surface of a shaft to which the tool may be attached.

3. The tool of claim 2 wherein said flexible arms can circumferentially extend about the threads of a shaft and jointly form a shield which isolates the shaft threads from a seal means.

4. The tool of claim 2 wherein the forward end of said body is curved outwardly and rearwardly so that the medial part of the flexible arms can lie adjacent to the forward end of said body and extend rearwardly in the above described manner.

5. The tool of claim 2 wherein the magnet is a cylindrical permanent magnet cemented to the rear face of the main body.

6. The tool of claim 2 wherein said main body is round in cross-sectional configuration.

7. The tool of claim 1 wherein said flexible arms are a plurality of flexible, relatively long, thin metallic strips having a medial part thereof attached to the forward end of said main body, thereby leaving the marginal ends extending along said body and arranged to lie adjacent to and cover the threaded surface of a shaft to which the tool is attached;

said flexible arms can be made to circumferentially extend about the threads and jointly form a shield which isolates the threads from the seal means.

8. The tool of claim 7 wherein the magnet is a cylindrical permanent magnet cemented to the rear face of the main body.

9. An entering tool for attachment to the end of a shaft, and for protecting a seal means as a shaft end is telescopingly received therein, said tool comprises a main body having a longitudinal axis which can be axially aligned with a shaft and a seal for the shaft, a magnet formed at one end of said main body, a plurality of elongated, thin, flexible arms having one end affixed to said main body in spaced relationship to said magnet, the other end of said fingers extend from said main body and can be curved back along said main body to cover the entire outer surface of said main body;

said arms, when said tool is magnetically attached to the end of a shaft, extend rearwardly past said magnet and can be placed circumferentially about a marginal end of a shaft to cover the outer surface thereof and prevent the shaft from damaging a seal means.

10. The tool of claim 9 wherein said flexible arms are a plurality of relatively long, thin, flexible metallic strips having a medial part attached to the forward end of said main body, thereby leaving the marginal ends extending along said body and arranged to lie adjacent to and cover the threaded surface of a shaft to which the tool may be attached.

11. The tool of claim 10 wherein said flexible arms can circumferentially extend about the threads of a shaft and jointly form a shield which isolates the shaft threads from a seal means.

12. The tool of claim 11 wherein the forward end of said body is curved outwardly and rearwardly so that the medial part of the flexible arms can lie adjacent to the forward end of said body and extend rearwardly in the above described manner.

13. The tool of claim 10 wherein the magnet is a cylindrical permanent magnet cemented to the rear face of the main body.

14. The tool of claim 10 wherein said main body is round in cross-sectional configuration.

15. Method of entering a threaded end of a shaft into a seal means comprising the steps of:

magnetically attaching a body to the threaded end of the shaft with the body having an axial centerline aligned with the axial centerline of the shaft;

attaching elongated, thin, flexible members to said body and arranging said flexible members to lie adjacent to the outer surface of said body and to extend rearwardly to enclose most of the threads of the threaded shaft end; said body having a diameter which does not exceed the diameter of the shaft end;

extending the body and shaft end through the seal means; and then removing the body from the end of the shaft.

* * * * *